United States Patent
Torkkell et al.

(12)
(10) Patent No.: US 6,258,328 B1
(45) Date of Patent: Jul. 10, 2001

(54) HONEYCOMB STRUCTURE FOR A CATALYST

(75) Inventors: Keijo Torkkell, Jyväskylä ; Aimo Lehtimäki, Vihtavuori; Timo Avikainen, Laukaa, all of (FI)

(73) Assignee: Kemira Metalkat Oy, Vihtavuori (FI)

( * ) Notice: Subject to any disclaimer, the term of this patent is extended or adjusted under 35 U.S.C. 154(b) by 0 days.

(21) Appl. No.: 09/143,509

(22) Filed: Aug. 29, 1998

(30) Foreign Application Priority Data

Sep. 5, 1997 (FI) .......................................... 973609

(51) Int. Cl.$^7$ ........................... B01D 53/94; B01D 53/34; F01N 3/28
(52) U.S. Cl. ........................... 422/180; 422/177; 422/222; 428/116; 428/593; 502/439
(58) Field of Search ..................................... 422/177, 179, 422/180, 222; 502/439; 428/116, 593–594

(56) References Cited

U.S. PATENT DOCUMENTS

| 5,139,844 | 8/1992 | Maus et al. ............................ 428/116 |
| 5,447,697 | 9/1995 | Ito et al. ................................. 422/179 |

FOREIGN PATENT DOCUMENTS

| 41 11 629 | 10/1991 | (DE) . |
| 210546 | 2/1987 | (EP) . |
| 245737 | 11/1987 | (EP) . |
| 245738 | 11/1987 | (EP) . |
| 322566 | 7/1989 | (EP) . |
| 486276 | 5/1992 | (EP) . |
| 631815 | 1/1995 | (EP) . |
| 96/26805 | 9/1996 | (WO) . |
| 97/02884 | 1/1997 | (WO) . |

OTHER PUBLICATIONS

*Development of a Highly Heat–Resistant Metal Support Catalyst*, SAE Technical Paper Series, International Congress and Exposition, Feb. 25–Mar. 1, 1991, No. 910615, pp. 16–23.

Primary Examiner—Hien Tran
(74) Attorney, Agent, or Firm—Andrus, Sceales, Starke & Sawall, LLP

(57) ABSTRACT

The present invention relates to a catalyst comprising a honeycomb (1) and a surrounding jacket, the honeycomb comprising a structure formed of a stack of metal sheets, of which at least part are profiled, and the honeycomb structure including several through-flow channels for gas. The free ends of the said metal sheets are distributed over a part ($S_1$) of the honeycomb periphery unsymmetrically to the center of the honeycomb so that part ($F_1$) of the honeycomb's periphery is free from the free ends of the metal sheets. The said honeycomb is attached either directly or through an intermediate layer to the said jacket over an area ($L_1$) comprising at least part of the said free ends.

14 Claims, 6 Drawing Sheets

A–A

HONEYCOMB STRUCTURE FOR A CATALYST

The present invention relates to a catalyst comprising a honeycomb and a surrounding jacket; the honeycomb comprises a structure formed of a stack of metal sheets, at least part of which are profiled, the honeycomb structure comprising numerous through-flow channels for gases.

The invention especially relates to a honeycomb for a catalyst and to the fastening of the honeycomb to the surrounding jacket; the product is typically used for purifying emissions from a combustion engine by oxidizing gaseous impurities or impurities adhered to the particle surfaces, and by reducing nitrogen oxides.

BACKGROUND OF THE INVENTION

A metal honeycomb for a catalyst typically consists of thin metal sheets, which form a multiplicity of channels through which gas may penetrate the honeycomb. Typically the honeycomb consists of two metal sheets, the one of which is corrugated and the other is substantially smoother so that a multiplicity of channels is generated by combining the sheets in alternating layers. A ceramic support is added onto the surface of the honeycomb, increasing the geometrical area of the catalyst, and including compounds which intensify the activity; the said compounds may, for example, store gaseous compounds. Additionally, the support acts as a base for precious metals which are the actual catalytically active components. The ceramic support may be added onto the surface of the metal sheets before the honeycomb is manufactured, the method being then called 'open coating'; or the support may be added after rolling, composing or bending of the honeycomb, when the expression 'honeycomb coating' is used.

In order to operate, the catalyst has to reach an appropriate operation temperature (ignition temperature) which may be, for example, over 250° C., depending on the precious metal loading of the catalyst and the type of engine. The tightening of emission limits has resulted in the need to reach the ignition temperature as quickly as possible. Previously, heating a smaller electric catalyst installed in front of the actual catalyst with electric power was considered to be one solution for fast ignition. Thus it was possible to maintain the catalyst's traditional position under the car chassis. However, this solution has been almost totally abandoned, due to costs and problems related with technology. It has become an established practice to solve the demand for fast ignition by installing a catalyst or a smaller precatalyst directly in connection with the exhaust manifold into a so-called 'close coupled' position which, however, makes great demands on the durability of the catalyst, because the thermal and mechanical stresses applied to the catalyst are considerable.

In the 'close coupled' position, large acceleration forces are applied to the catalyst on frequencies typically of 50–400 Hz. At worst these acceleration values transmitted from the engine body to the catalyst via the exhaust manifold are several dozens of times the earth gravity acceleration. Further, pulsive impulses of the exhaust gas flow affect the catalyst honeycomb and especially its frontal surface said impulses causing vibrations of the frontal surface of the honeycomb at the combustion frequency of the engine. In this connection, the expression high-frequency fatigue is used of these phenomena.

In addition to the high-frequency fatigue, a considerable cycling of thermo-thermal forces is directed to the catalyst honeycomb which are worst in the 'close coupled' position. When starting a car or when increasing fast the load of the motor, the exhaust gas temperature rises, and also the concentrations of the components to be oxidized in the catalyst increase, leading to the heating of the catalyst and to a drastic rise in temperature, at first especially in the central parts of the honeycomb. Thermal expansion of the metal honeycomb due to thermal gradient against the colder jacket surrounding the honeycomb leads to compression stress in the honeycomb; this means that, in high stresses in temperatures of about 900–1000° C. the honeycomb, which is typically manufactured of ferrite steel, is unavoidably deformed to some extent, depending, for example on the size of the said thermal gradient, which again is affected by, for example, external or internal thermal insulation used in the jacket, and flow distribution. When the engine load is reduced or the engine is turned off, the engine temperature falls, and the honeycomb and the jacket contract. The honeycomb then tends to take the new, smaller volume it adopted in the high temperature, and a tensile stress is generated between the honeycomb and the jacket, which at worst leads to the tearing away of the honeycomb from the casing. In addition to the radial direction, temperature gradients are also present in the honeycomb in the flow direction, i.e. in the axial direction, causing extra thermal stresses. The forces generated by thermal cycling are called thermal fatigue.

PRESENT TECHNOLOGY

Established ways to control the high-frequency fatigue directed to the metal honeycomb have included the reinforcing of the honeycomb structure so that, for example, stronger metal sheets have been used. These may have been made of a thicker or otherwise stronger material. Products have been commercially available for a long time, in which a smoother sheet, to which larger stresses are applied than to a corrugated sheet, has been made of a stronger material than the corrugated sheet, or its thickness has been increased. The sheets forming the channels have been brazed or beam-welded together. It has been tried to control the impact-like pulse caused by the exhaust gas also by improving the flow distribution of the product, or by increasing the cross-sectional area of the honeycomb; the best way to combine these has been to turn the honeycomb into a diagonal position in relation to the coming flow of gas.

The problem of thermal fatigue has strongly presented itself only in conjunction with the 'close coupled' position, especially with structures brazed to the jacket tube and inside the honeycomb, in which the cyclically changing temperature has caused large residual stresses. The control of this situation has mainly been related to the increase of the honeycomb flexibility by reducing the joint surface between the jacket tube and the honeycomb in the axial direction. With structures in which the single sheets or pairs of sheets formed by joined corrugated and smooth bands are spaced apart, the stresses caused by thermal fatigue are much smaller, but they may, however, cause the honeycomb to slacken, which reduces the durability for high-frequency fatigue.

In the patent EP-0 245 738 there are described bent and rolled structures in which the strength of the honeycomb has been increased by reinforcing walls. The reinforcing walls may be used to affect the natural frequencies of the honeycomb and to thus increase the durability for high-frequency fatigue. However, it has been difficult to control the durability for thermal fatigue with these structures in which the increased rigidity of the honeycomb may even be dangerous to the durability of the honeycomb. In addition, the reinforcing wall in the structure presents extra mass and extra costs.

EP-0 245 737 discloses a catalyst structure in which a piled up stack of metal sheets is bent or rolled to opposite directions. It is characteristic of this structure that the sheets are symmetrically joined to the jacket periphery at two opposite sectors or segments. The structure is flexible, in case the single sheets are unattached, but if the durability for high-frequency fatigue of the structure is increased by attaching the sheets to each other, a situation is caused in which it is necessary to increase the durability for thermal fatigue typically by reducing the joint area in the axial direction, as has been described in the publication WO-96/26805.

The patent EP-0 631 815 discloses a honeycomb bent to S form in which pairs of bands of corrugated and smooth sheets made of a stronger alloy are used, the pairs acting as reinforcing layers. In addition, the patent discloses how an uncorrugated sheet may do an extra round and thus form a jacket for the honeycomb. In this structure, one also concentrates in the stiffening of the internal structure of the honeycomb, with which it is not possible to affect the durability of the honeycomb for thermal fatigue.

The publication SAE-910615 describes problems related with a catalyst installed near the engine. The temperature difference between the catalyst jacket and the outermost part of the honeycomb is said to be 400° C., which leads to strong thermal fatigue. Three different catalyst structures were tested, of which a structure in which the front edge of the honeycomb, and likewise the outermost plies of a spiral roll were brazed, proved to be the best. The fastening to the jacket was accomplished at the outlet side. The inside and the outlet end of the honeycomb were left unbrazed. According to the publication, the honeycomb did not tear off from the jacket, and neither did it show damages in places in which the brazed front surface breaks and protrudes forward. By leaving the inside of the honeycomb and the outlet unsoldered, and by fastening the honeycomb only at the outlet edge, it was possible to increase the elasticity of the structure with regard to thermal fatigue so that it passed the test used.

The publication WO-96/26805 discloses a structure, in which a smooth band belonging to the honeycomb structure surrounds partial length of the honeycomb in axial direction. Thus, it is possible to prevent undesired brazing joints between the honeycomb and the jacket tube. According to the publication, it is thus possible to prevent the joining together all the way between the jacket and casing and thus to improve the durability for the product's thermal fatigue. The described method requires the shaping of the smooth band or, alternatively, the use of one or more narrow bands which surround part of the honeycomb's length.

The patent publication EP-0 486 276 describes the joint between a honeycomb and a jacket tube in a semi-oval honeycomb with which it is, according to the publication, possible to obtain an excellent durability for thermal fatigue. In the publication, the fastening of the honeycomb to the jacket tube is limited to curved parts or, alternatively, to parallel parts.

It is typical of some of the products described that the honeycomb is made by rolling a continuous pair of bands consisting of a corrugated and a smooth sheet which have been joined together by brazing through the structure; the brazing has possibly been reduced in the inside of the honeycomb in order to increase elasticity. Another way to manufacture the honeycomb is to superimpose short-cut corrugated and smooth sheets and to bend the ends of the generally rectangular stack of sheets thus formed to opposite directions. The ends of the sheets of the honeycomb formed are fastened to the jacket typically at equal intervals or to two sectors which are very close to each other, and the brazing is typically carried out in the area between the said sectors. The brazing surrounds the product, and its amount has possibly been reduced in axial direction for increasing elasticity. In addition, there are U, V and cross-shaped structures which, however, lack the ability related with a spiral roll to balance thermal expansion by twisting inside the honeycomb.

SUMMARY OF THE INVENTION

It is the object of the invention to provide a catalyst which has both good durability for thermal fatigue and good durability for high-frequency fatigue.

In accordance with the invention, there is provided a catalyst comprising a honeycomb and a surrounding jacket. The honeycomb includes a structure formed of a stack of metal sheets, at least part of which are profiled, the honeycomb structure having several through-flow channels for gas. In the honeycomb, the free ends of the metal sheets are distributed over a part of the honeycomb periphery unsymmetrically to the center of the honeycomb so that a part of the honeycomb's periphery is free from free ends of the metal sheets, and said honeycomb being attached either directly or via an intermediate layer to the jacket over an area comprising at least part of the said free ends.

According to the invention, the said honeycomb structure may be formed by bending the ends of the metal sheet stack to opposite directions for forming a so-called S model honeycomb. In a honeycomb structure formed in this way, the free ends of the metal sheets originate from both ends of the metal sheet stack.

In accordance with the invention, the said honeycomb structure may also be formed by spirally rolling a stack of metal sheets the thickness of which increases in the rolling direction. If the starting point of the rolling includes cut sheets, the free ends of the metal sheets in the produced honeycomb structure come from the thicker end of the metal sheet stack. If again the starting point of the rolling includes bent sheets, the free ends of the metal sheets in the honeycomb structure come from the non-bent thicker end of the sheet stack.

The said free ends of the metal sheets are distributed over a part of the honeycomb's periphery, preferably forming about 25–90% of the length of the periphery.

The said stack of metal sheets advantageously consists of several pairs of sheets, the single pairs comprising a substantially smooth or slightly corrugated sheet and a corrugated sheet. In accordance with the invention, the substantially smooth or slightly corrugated sheet and the corrugated sheet of a single pair of sheets may be attached to each other, for example, by welding.

For example, the said stack of metal sheets may comprise about 2–15 pairs of sheets but, depending on the structure, it is possible to use an even larger number of pairs.

In accordance with an advantageous embodiment of the present invention, there exists a fastening area between the honeycomb and the jacket along the whole length or its part in axial direction of the honeycomb, the said area comprising the said part of the periphery in which the free ends of the metal sheets are situated; in the peripheral direction of the honeycomb, there exists an unfastened area which comprises at least part of the said peripheral part which is free of the free ends of the metal sheets. In accordance with the invention, the honeycomb and the jacket may be joined with each other in the said fastening area, for example, by brazing or welding.

The jacket of a catalyst of the invention may have a circular, semi-oval (race-track) or oval cross-section.

The honeycomb of the catalyst of the invention may additionally include one or several reinforcing sheets the thickness of which is larger than that of the other metal sheets. The length of the reinforcing sheet may be longer than that of other sheets so that reinforcing sheet forms the said intermediate layer between the honeycomb's periphery or its part and the jacket.

As presented above, the free ends of the metal sheets are distributed over a part of the honeycomb's periphery unsymmetrically to the center of the honeycomb. In addition, it is possible that the center of the honeycomb is not uniform with the axis of symmetry of the jacket.

In the manufacture of a catalyst of the invention, the 'open coating' or the 'honeycomb coating' technique may be used.

BRIEF DESCRIPTION OF THE DRAWINGS

The present invention is next described in more detail referring to the enclosed drawings in which.

DETAILED DESCRIPTION OF THE PREFERRED EMBODIMENTS

Figure 1:
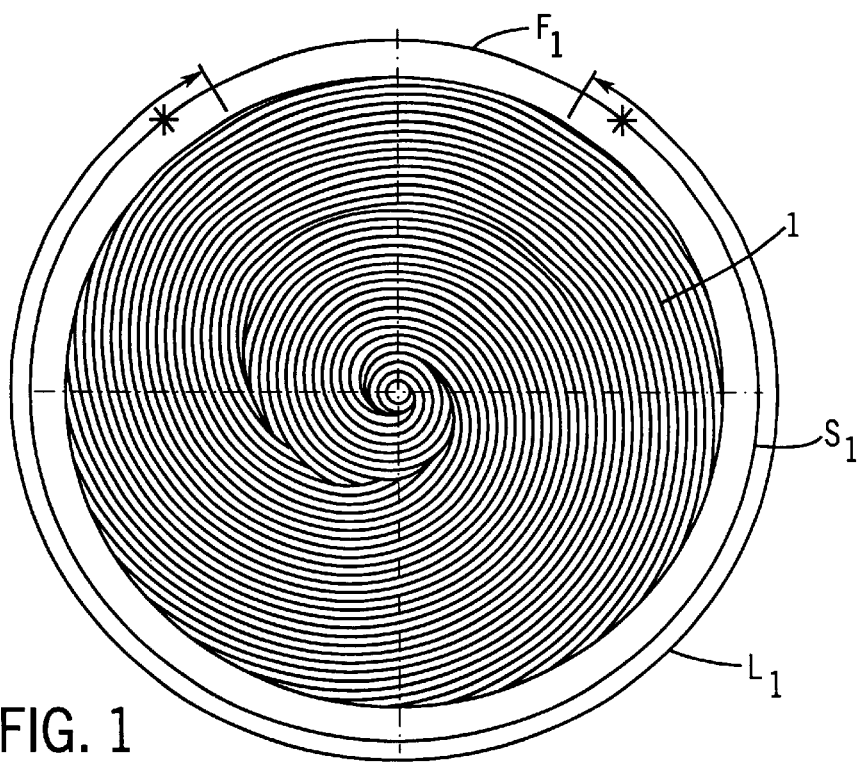
FIG. 1 presents a structure of a catalyst of the invention.
Figure 2:
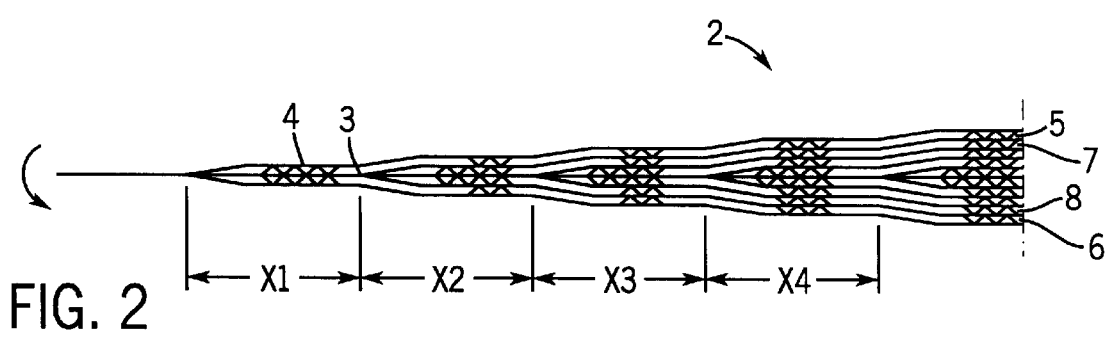
FIG. 2 shows the structure of the stack of metal sheets used in the manufacture of the catalyst in FIG. 1 in partial view.

In FIG. 1, there is described a honeycomb 1 for a catalyst of the invention rolled as an expanding spiral. In accordance with the invention, this product consists of superimposed pairs of metal sheets 5, 6, 7, 8 made of corrugated 3 and smooth 4 sheets cut to fixed sizes; these pairs of sheets (typically for example 2–15 pairs) are piled up to a stack 2, the thickness of which increases in the transverse direction of the flow channels, as is shown in FIG. 2. By starting to make the spiral roll from that end of the stack, in which the thickness of the stack is smallest, as shown in FIG. 2, and by proceeding to the direction in which new layers or sheets 7, 8 are continuously introduced to the stack of metal sheets, it is possible to make a product the structure of which forms a continously expanding spiral.

In the case of FIG. 2, the element or sheet 7, 8 increasing the thickness of the stack is formed of at least one pair of metal sheets consisting of one corrugated and one smooth sheet, which are not necessarily of uniform length.

Referring to FIG. 2, the expansion speed of the spiral may be controlled by choosing the distances $X_i$ from the spiral origin in a desired way and by increasing the number of elements at the point in question. The way the expansion points are situated with respect to the origin in a finished spiral may affect the ending of the sheets at the outer periphery. This procedure together with the controlled cut length of the sheets forming the stack may generate honeycomb structures in which the cut ends of the sheets meet in the desired sector $S_1$ of the jacket or along a desired length of the jacket periphery. With this procedure, it is possible to eliminate the need to braze e.g. a round product along the whole length of the periphery so that all the sheet ends would be locked to the jacket. In order to make the durability of the product sufficient against axially directed acceleration forces, the desired sector is preferably between 90°–330° with a round product, depending on the stress situation. With other than round products, the joining sector may be indicated as a percentage of the jacket periphery, and is correspondingly about 25–90%. The area $L_1$, along which the honeycomb is fastened to the jacket, is at least the size of the joining sector $S_1$, but generally somewhat larger because of manufacturing-technical reasons. A large joining sector reduces the elasticity of the honeycomb and weakens thus the durability for thermal stresses. The area $F_1$, which remains in the jacket outside the joining sector and which does not contain sheets joined with the periphery, receives the deformation caused by the thermal forces and increases the possibility of the honeycomb structure resembling a spiral to receive the thermal movement caused by thermal forces by twisting. Because in the product of the invention, the said movement and with it possibly associated deformation are directed and controlled, this part of the honeycomb may, for example in connection with canning, be protected against exhaustion pulse, thus ensuring the durability of the component spaced apart from the wall. Because the durability of the honeycomb for thermal forces is based on directed thermal movement and deformation, the fastening may be carried out in axial direction from the sheet ends at the wall length or its part, if so desired. Different forms of brazing or, for example, beam welding techniques may be used in the fastening.

A product which is characterized by an expanding spiral structure may be used for the easy manufacture of products, the properties of which change in the radial direction because, for example, sheets extending to the center of the product may be of different strength, or they may have different aperture numbers, catalytic properties (open coating) or some other properties from the sheets which are introduced to the stack at a later part of the spiral. Thus it is, for example, possible to influence the flow distribution of the product so that bigger channels reducing the flow resistance or channels the form of which makes it easy to release gases are situated in the peripheral area of the product, in which the gas flow typically is smaller than in the center. Also pairs of sheets or layer elements joining the structure in stages may be fastened to the sheets in different ways. Thus, part of the sheets may be welded together, for example, by a laser method, and part is free without fastenings. By fastening the reinforced area may be directed to a place where the high-frequency fatigue is strongest. In this product of the invention, the thermal movement is smoothed by the helicoidal movement of the spiral, leading to a good durability for thermal fatigue.

The product of the invention may be made of metal sheets of different types, for example, austenitic nickel-chrome-aluminium-ferrous sorts and ferrite iron-chrome-aluminium sorts. In the metal sheet, aluminium or part of it may have been added by a coating method, including typically, for example, hot aluminizing, mechanical coating, vaporization or sputterization. The honeycomb is typically installed into the jacket tube or between deep-drawn casings, or it may also be placed directly inside the casting mould, and the jacket may be cast as part of, for example, the engine's exhaust manifold.

Figure 3:
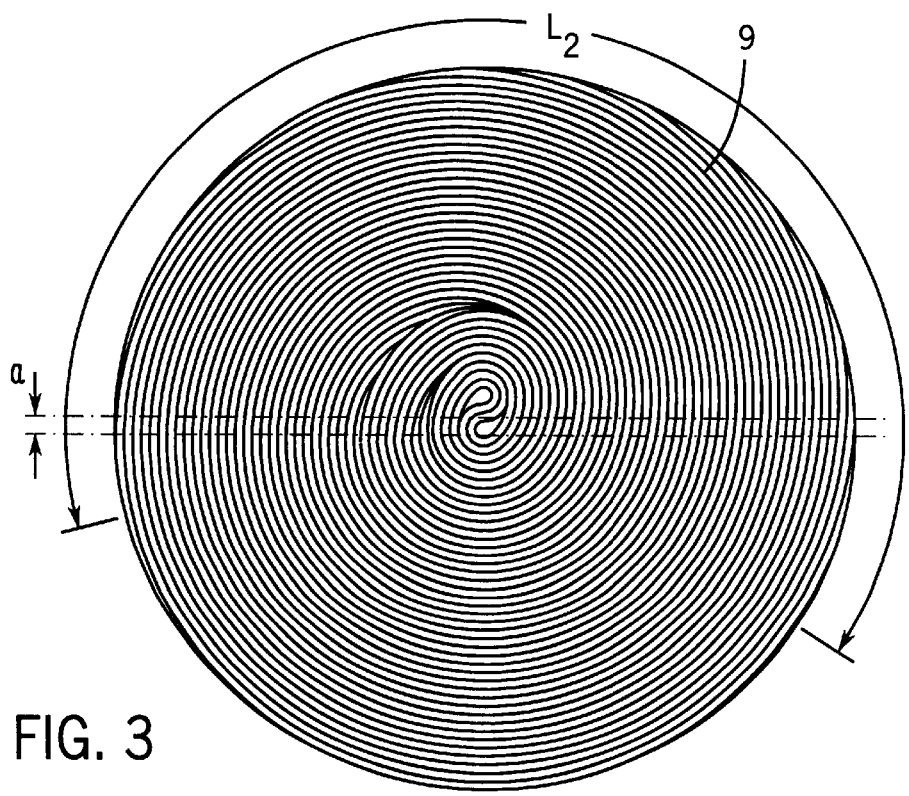
FIG. 3 shows another structure of a catalyst of the invention.
Figure 4:
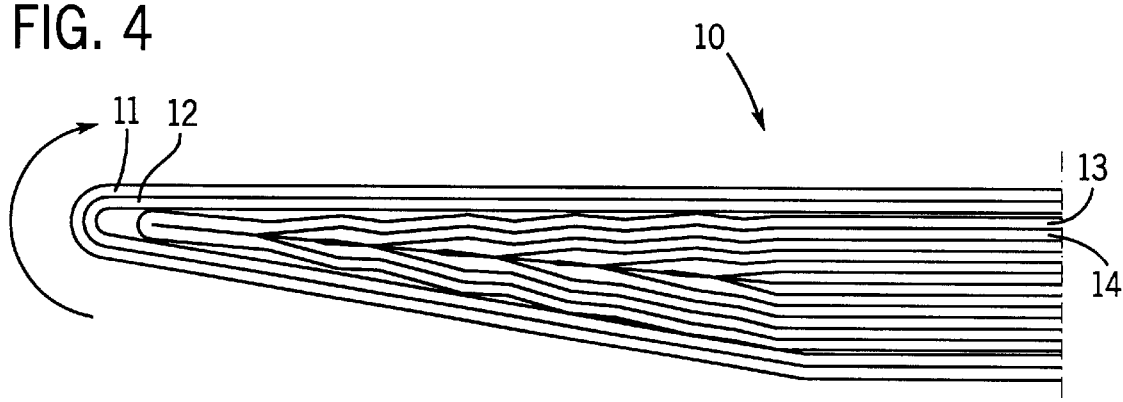
FIG. 4 is a partial view of the structure of the metal sheet stack used in the manufacture of a catalyst in FIG. 3.

In FIG. 3, there is described a catalyst honeycomb 9 of the invention rolled as an expanding spiral. The said product of the invention is a modification of the structure shown in FIG. 1. The product is manufactured of the stack of metal sheets 10 shown in FIG. 4. The metal sheet stack 10 consists of two superimposed pairs of sheets 11, 12, which have been double-folded and which contain elements increasing the thickness of the stack fitted inbetween, the elements consisting of double-fold pairs of metal sheets. In FIG. 4, two such pairs of metal sheets are indicated with reference numbers 13, 14. A single pair of metal sheets consists of a corrugated and a smooth metal sheet. The spiral rolling is begun from the end of the stack, in which the thickness is smallest, as shown in FIG. 4. Thus, a product is achieved, the structure of which forms a continuously expanding spiral. In the way described above, it is possible to manufacture a honeycomb in which the center of the spiral rolling has moved away from at least one axis of symmetry of the product. This transition is indicated with α in FIG. 3. $L_2$ represents the area along which the honeycomb is fastened to the jacket.

Figure 5:
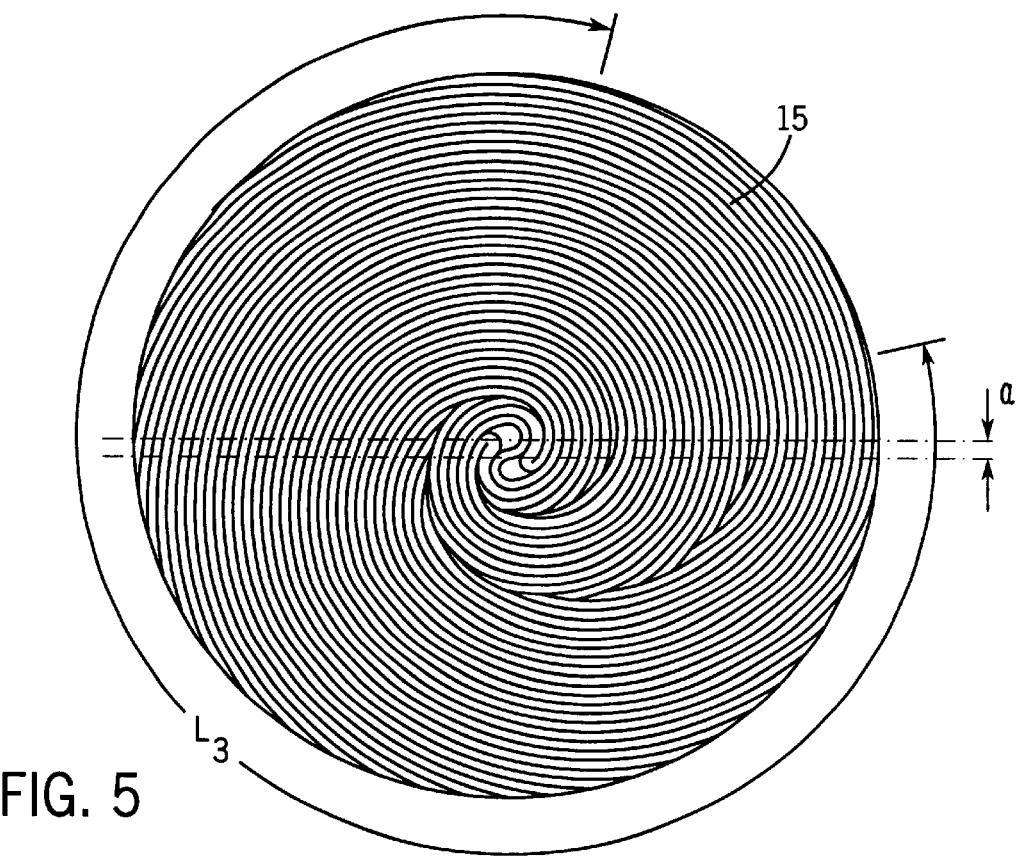
FIG. 5 presents a third structure of a catalyst of the invention.
Figure 6:
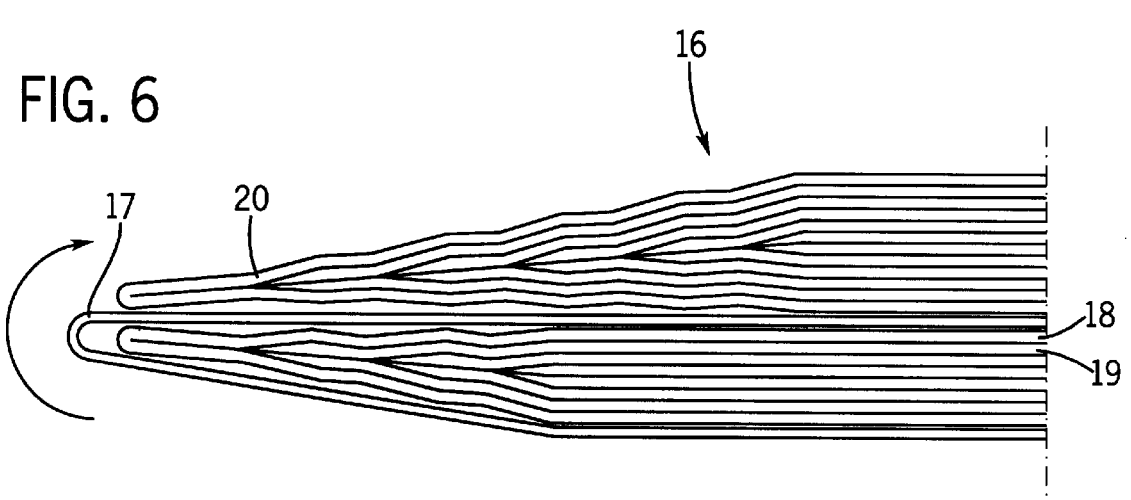
FIG. 6 is a partial view of the structure of the metal sheet stack used in the manufacture of a catalyst in FIG. 5.

FIG. 5 describes a catalyst honeycomb 15 of the invention, rolled as an expanding spiral. This product of the invention is a modification of the structures shown in FIGS. 1 and 3. The said product is manufactured of a stack of metal sheets 16 shown in FIG. 6. The stack of metal sheets 16 is formed of a double-fold pair of sheets 17 which has elements increasing the thickness of the stack fitted inbetween, the said elements being formed of double-fold pairs of metal sheets. Two such pairs of metal sheets are indicated with reference numbers 18, 19 in FIG. 6. Elements increasing the thickness of the stack have also been fitted on the pair of metal sheets 17 which are likewise made of double-fold pairs of metal sheets, one of which is marked with the reference number 20. The rolling of the spiral is started from the end of the stack with the smallest thickness, as shown in FIG. 6, so that a product may be made, the structure of which forms a continuously expanding spiral. In the way described above, it is possible to manufacture a honeycomb 15, in which the center of the spiral rolling has moved away from at least one axis of symmetry of the product. This transition is marked with α in FIG. 5. $L_3$ represents an area along which the honeycomb is fastened to the jacket.

Figure 7:
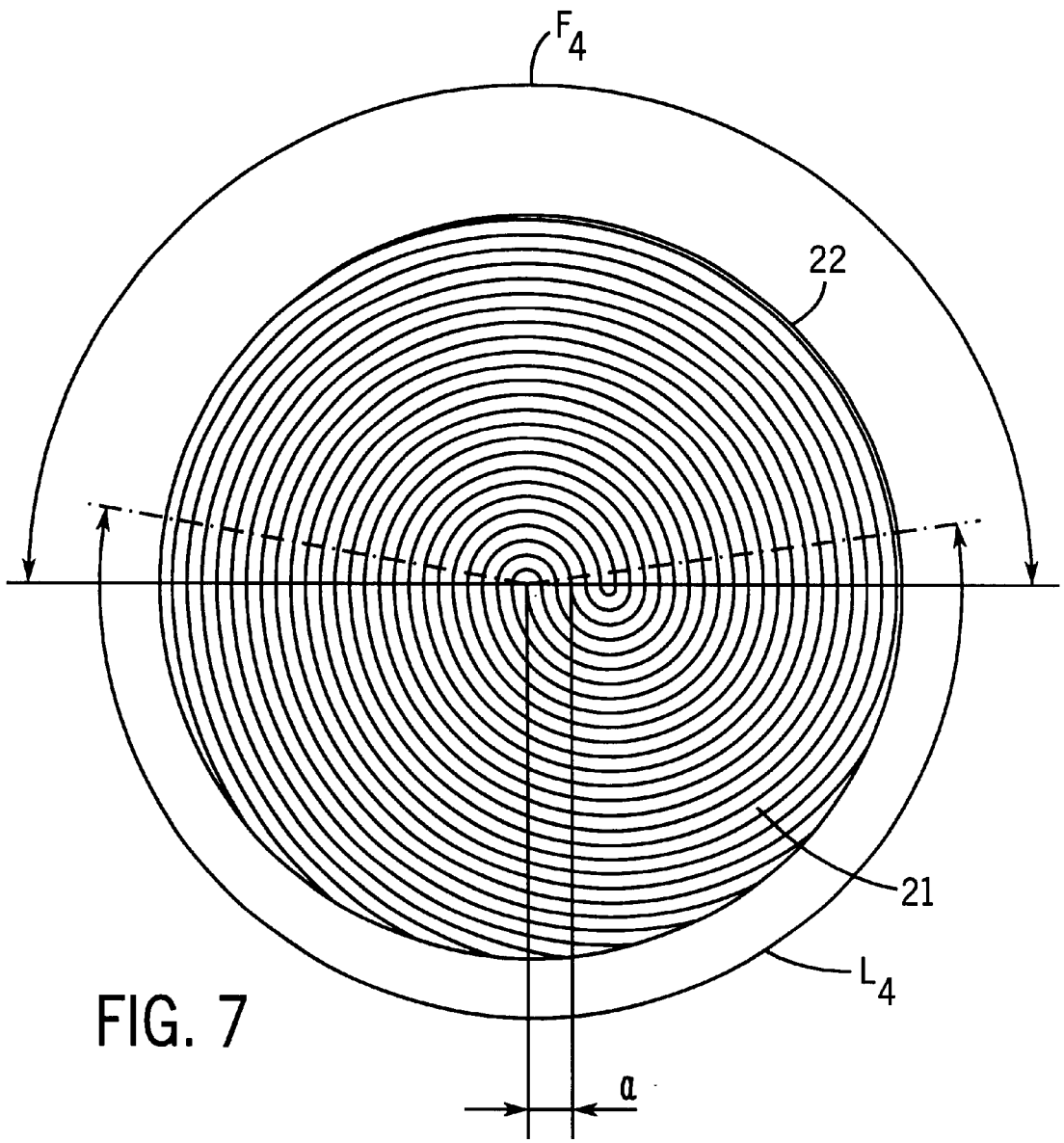
FIG. 7 describes a fourth structure of a catalyst of the invention.

In FIG. 7, there is shown a product of the invention which comprises an eccentric S formed catalyst honeycomb 21. This product consists of superimposed pairs of metal sheets formed by corrugated and smooth sheets cut to fixed sizes, the pairs of metal sheets being of different length (typically, for example, 4–35 pairs). The product is rolled spirally by grasping the stack of metal sheets at one or two precisely predetermined places, the place of the center between the pairs is not situated at the center with respect to the rolling direction of the stack, but the bond is unsymmetrical. With this procedure, it is possible to manufacture a honeycomb in which the center of the spiral rolling has moved away from at least one axis of symmetry of the product. This transition is indicated with α. This procedure together with the controlled cut length of the metal sheets may be used for producing honeycomb structures in which the ends of the cut metal sheets meet in the desired sector of the jacket 22, or along a desired length of the jacket's periphery.

With this procedure, it is possible to eliminate the need for brazing e.g. a round product along the whole peripheral length in order to lock the ends of all the metal sheets to the jacket. In order to make the durability of the product against axial acceleration forces sufficient, with a round product, the desired sector is about 90°–330°, depending on the stress situation. With other than circular products, the joining sector may be indicated as a percentage of the jacket's periphery, and is correspondingly about 25–90%. The area $L_4$ along which the honeycomb is fastened to the jacket is at its minimum the size of the joining sector, but generally somewhat larger, due to manufacturing-technical reasons. A large joining sector reduces the elasticity of the jacket and weakens thus its durability for thermal stresses. The area $F_4$ which remains in the jacket outside the joining sector and which does not include metal sheets joined with the periphery, receives the deformation caused by thermal forces and increases the possibility of the honeycomb structure resembling a spiral to receive the thermal movement caused by the thermal forces by twisting. Because the said movement and with it possibly related deformation are directed and controlled in the product of the invention, this part of the honeycomb may, for example in connection with canning, be protected against exhaust pulse, and it is thus possible to ensure the durability of the part spaced apart from the wall. Because the durability of the honeycomb for thermal forces is based on a directed thermal movement and deformation, the fastening may be carried out from the ends of the metal sheets in axial direction along the whole length or its part, if so desired. Various forms of brazing or, for example, beam welding may be used as fastening techniques.

Figure 8A:
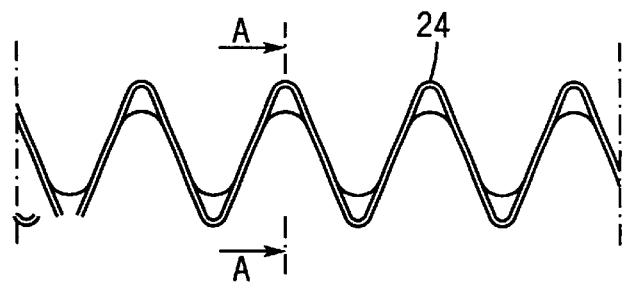
FIG. 8A describes the same structure as in FIG. 8, but as a side view and in enlarged scale.
Figure 8:
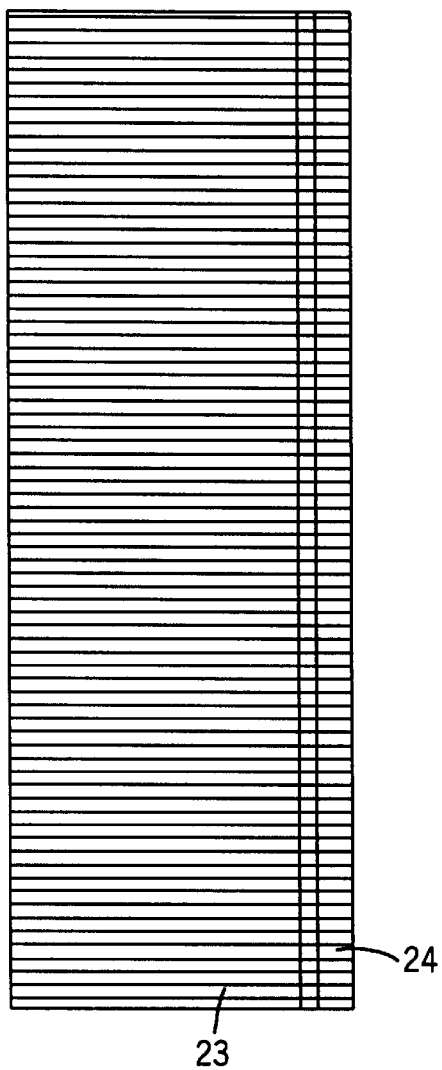
FIG. 8 is a top view of a structure of corrugated sheets used in the manufacture of catalysts of the invention.
Figure 8B:
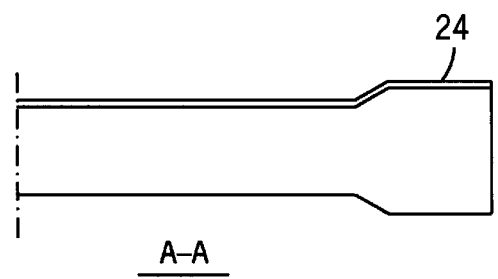
FIG. 8B is a sectional view of the point A—A in FIG. 8A.

In FIGS. 8, 8A and 8B, there is shown a corrugated metal sheet which may be used in the manufacture of catalysts of the present invention. The said corrugated metal sheet is indicated with the reference number 23. The front edge 24 of the corrugated metal sheet 23 is shaped during the corrugation process so that it is on a higher level than the other parts of the corrugated metal sheet. The front edge 24 of the corrugated metal sheet and a smooth metal sheet may be joined together, for example, by laser welding. The welding may be carried out, for example, from every second corrugation top so that the corrugation inbetween is capable of receiving the bending caused by the rolling by being elastic.

Figure 9:
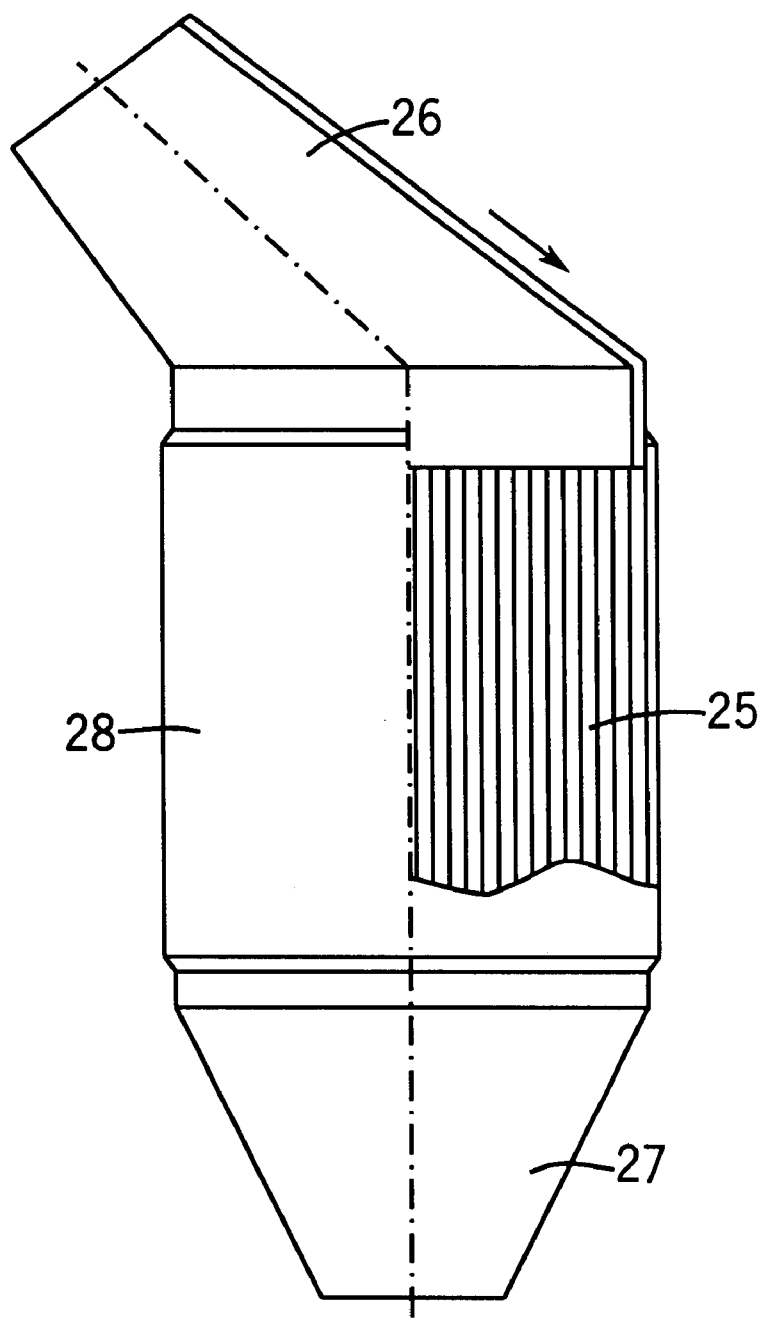
FIG. 9 describes a catalyst of the invention with end cones.

In FIG. 9, there is shown a structure of a finished catalyst comprising a honeycomb 25 and a surrounding jacket tube 28. An end cone 26 is attached to the entry side of the honeycomb 25, the cone being installed diagonally to the longitudinal axis of the honeycomb. In FIG. 9, the flow direction of gas is indicated with an arrow. An end cone 27 is fitted to the exit side of the honeycomb 25.

With products of the invention, the biggest advantages may be achieved by a circular honeycomb body; in its manufacture, the usual problem is to achieve sufficient elasticity especially when rolling the honeycomb from a stack of metal sheets. However, the invention is not limited to this single geometry, because the eccentricity of the rolling center in a perpendicular direction to the direction of the flow channels may be utilized also e.g. in an oval geometry. Thus, it is possible to align the starting and ending points of the metal sheets with a desired sector in the inner periphery of the jacket and leave the other part of the honeycomb without fastening its main part to the casing. By utilizing an expanding spiral, a honeycomb may be manufactured, the center of which contains an aperture of a desired size. By flattening the honeycomb so that the aperture closes, a semi-oval honeycomb is formed, in which the asymmetry of the joining points of the metal sheets in relation to the center of the honeycomb is controlled by the asymmetry of the spiral expansion also by flattening direction.

Products of the invention, their manufacture and properties are next described with the help of the following examples.

EXAMPLE 1

A product A according to the invention, which comprises a catalyst honeycomb 1 rolled as an expanding spiral and which is shown in FIG. 1, was made by precoating a corrugated and a smooth steel sheet so that a strip of 7 mm wide was left uncoated from their front edge. The adhesion of the support with the sheet was improved by cleaning the sheet by annealing it at a temperature of 550° C. for 4 hours. This procedure was not found to interfere with laser welding conducted later. The preliminary treatment or that part of the preliminary treatments oxidizing or nitriding the sheet surface may also be applied only to the particular part of the sheet, to which the support is added at the first stage, and the part to be welded is cleaned in a different way. In a chemical or electrolytic cleaning, this may, for example, be based on the partial immersion of the sheet to a reactant or electrolytic solution, and in a thermal treatment, on leaving the part to be welded outside the resistance or flame heating or on applying the induction heating onto the edge to be coated with the support. The front edge of the corrugated sheet was shaped during the corrugation stage in a way shown in FIGS. 8, 8A and 8B so that a corrugated and a smooth sheet could be joined together by Nd-YAG-laser welding the uncoated edge, and the elements needed in an expanding spiral could be formed. Welding was carried out from every second corrugation top so that the corrugation inbetween was able to receive the bending caused by the rolling by being elastic. After the welding, the rolling was carried out from the thin end of the stack, and finally, the support was added to the front edge of the honeycomb by dipping the honeycomb into the support. Finally, such an amount of palladium was added to the support that the palladium charging of the catalyst was 200 g of palladium for one cubic foot. The relation between the lengths of corrugated and smooth sheets was set so that with the corrugated roll geometry used, the aperture number of the product, i.e. the number of channels for cubic inch, was 400. By calculating in advance and by testing, the non-central points in relation to origin were searched for bringing the layers expanding the spiral into the structure so that the ending of the pairs of sheets at the outer periphery could be controlled in the sector interval of 90°–330°. In a manufactured product, the sector $S_1$ was chosen to be 270°. Brazing to the jacket was conducted in a sector $L_1$ of 290° in axial direction over a distance of 16 mm from the centre of the honeycomb by using an induction method. End cones were attached to the manufactured product in a way shown in FIG. 9.

The reference product B was a honeycomb manufactured by vacuum brazing. The honeycomb was brazed through and attached to the jacket over the whole length. No support or precious metals were added to the honeycomb so that its operating temperature in the test performed was a little lower than that of a honeycomb made of pairs of sheets, because oxidation reactions did not take place in the honeycomb in as large an extent. Thus, it may be considered that the test conditions were easier for the product B than product A.

Data about the product A according to the invention and the reference product B are gathered in the following Table 1.

TABLE 1

|  | A: Product according to the invention | B: Reference product |
| --- | --- | --- |
| Honeycomb diameter | 68.5 mm | 68.5 mm |
| Honeycomb length | 74.5 mm | 74.5 mm |
| Aperture number | 400 | 400 |
| Sheets | 50 μm/Fe—20Cr—5Al | 50 μm/Fe—20Cr—5Al |
| Pd loading | 200 g/ft³ | 0 |
| Structure description | Laser-welded pairs of sheets, expanding spiral attached to the casing over the sector (290°). Joining sector 270°. | Vacuum-brazed structure, honeycomb completely attached to the casing (360°) and single sheet layers joined with each other. |

The durability for thermal fatigue and high-frequency fatigue of the catalyst A according to the invention and of the reference catalyst B was tested by installing two of them side by side to the exhaust manifold of an engine into a so-called close coupled position. In the tests a 2-liter, 16-valve engine was used, which was attached to a test bench. The test cycle used is shown in the next Table 2.

TABLE 2

|  | Stage 1 | Stage 2 |
| --- | --- | --- |
| Time | 6.5 min | 7.5 min |
| Motor rounds | 2800 rpm | 5200 rpm |
| Load | 20 Nm | full load |
| Exhaust gas temperature | 620° C. | 880° C. |

The test cycle generated strong thermal stresses to the catalysts as the exhaust gas temperature changed sharply at the entrance of the catalyst between 620° C.–880° C., and as the catalysts were uninsulated, the generated tension was strong, especially in the radial direction.

The catalysts were inspected every 20 hours. Then it was noticed that the reference catalysts B, which had both rigid honeycombs and rigid fastenings to the casing, were totally destroyed when the cycle had lasted 20 hours. The honeycombs were torn loose from the jacket due to radial and axial thermal forces, and they had then vibrated within the jacket so that the outer periphery of the honeycombs lacked metal sheet layers over the entire peripheral length.

The catalyst A according to the invention was inspected a second time after the test cycle had lasted 40 hours. It could be observed that the catalyst honeycombs still were undamaged, and after the front cone was removed, it was noticed that the thermal expansion movement had been directed into the desired area in a sector unattached to the jacket, because when feeling the front surface of the honeycomb, it was very tight. With a honeycomb rolled as an expanding spiral, in which the ends of the metal sheets were fastened to a limited sector, it was possible to direct the thermal movement so that no inner loosening took place, and to improve both the durability for thermal fatigue and to increase rigidity in relation to high-frequency fatigue.

EXAMPLE 2

A product C according to the invention, comprising a catalyst honeycomb bent in S form and shown in FIG. 7, was manufactured by precoating a corrugated and a smooth steel sheet so that a strip of 7 mm was left uncoated from the front edge. The adhesion of the support to the sheet had been improved by cleaning the sheet by annealing it at a temperature of 550° C. for 4 hours. This treatment was not found to interfere with laser welding. The preliminary treatments of the sheet or the part of the preliminary treatments oxidizing or nitrifying the surface of the sheet may also be directed to only that part of the sheet to which the support is added at the first stage, and the part to be welded is cleaned in another way. In chemical or electrolytic cleaning this may be based, for example, on the partial immersion of the sheet into a reactant or electrolytic solution, and in thermal treatment on that the part to be welded is left outside the resistance or flame heating, or that induction heating is directed to the edge to be coated with the support. The front edge of the corrugated sheet was shaped during the corrugation stage in a way shown in FIGS. 8, 8A and 8B so that it was possible to join together the corrugated and smooth sheets by Nd-YAG-laser welding at the uncoated edge without holes being burned into the sheets. After the welding, a support was added to the front edge of the honeycomb by dipping the honeycomb into the support; after calcination, palladium was added to the honeycomb by an absorption method so that the palladium loading of the catalyst was 200 g of palladium for one cubic foot. The finished pair of sheets was cut to fixed sizes in a way shown in FIG. 3 and piled up to stacks of five superimposed pairs of sheets. One smooth sheet of the same strength as the sheet used in the pairs was placed on top in order to prevent the corrugated bands from overlapping in the rolling. The relation between the corrugated and smooth sheets was set so that with the corrugation roll geometry used the aperture number of the product, i.e. the number of channels for a square inch, became 400. By calculating in advance and by experimenting, the non-central gripping points of the stack of sheets were searched so that the ending of the pairs of sheets to the outer periphery could be controlled in the sector interval of 90°–330°. In the manufactured product, the sector was chosen to be 180°. The eccentricity of the gripping is presented in Table 3. Soldering to the jacket was carried out in a sector $L_4$ of 200° in axial direction over a distance of 16 mm from the center of the honeycomb by an induction method. End cones were attached to the product in a way shown in FIG. 9.

TABLE 3

| Number of the pair of sheets | Length of the pair of sheets, mm | Gripping point in rolling, measured from the end of the pair of sheets in mm |
|---|---|---|
| Topmost smooth band | 530 | 264 |
| 1 | 547 | 275 |
| 2 | 549 | 280 |
| 3 | 562 | 294 |
| 4 | 565 | 296 |
| 5 | 562 | 290 |

The reference product D was manufactured in the same way as the product C of the invention, but the gripping of the stack of sheets was symmetrical, and both ends of all the pairs of sheets were distributed evenly over the outer periphery of the honeycomb so that brazing had to be carried out over the entire length of the periphery (360°), and no free point is thus generated to the area of the outer periphery of the product which operates on an average in a lower temperature, which is capable of buffering the thermal movement, and thus reduces thermal stresses.

Data about the product C of the invention and the reference product D are gathered into the following Table 4.

TABLE 4

|  | C: Product according to the invention | D: Reference product |
|---|---|---|
| Honeycomb diameter | 68.5 mm | 68.5 mm |
| Honeycomb length | 74.5 mm | 74.5 mm |
| Aperture number | 400 | 400 |
| Sheets | 50 µm/Fe—20Cr—Al | 50 µm/Fe—20Cr—Al |
| Pd charging | 200 g/ft³ | 200 g/ft³ |
| Description of the structure | Laser-welded pairs of sheets rolled non-centrally and attached to the casing in the sector (200°). Joining sector 180° | Laser-welded pairs of sheets rolled centrally and fastened to the casing along the whole length (360°) |

The durability for thermal fatigue and high-frequency fatigue of the catalyst C of the invention and the reference catalyst D was tested exactly by the same tests as in Example 1. These tests revealed the following:

The reference catalyst D, in which the honeycombs were elastic structures made of pairs of sheets, was inspected when the test had lasted 40 hours; both the honeycombs were still undamaged. Front cones were removed from the catalyst, and when feeling the rigidity of the front surfaces of the honeycombs, a slight loosening could be detected, which was due to the fact that the radial expansion of the honeycomb towards a cooler jacket had caused compression stress and a slight deformation to the structure. The deformation was evenly distributed between the different pairs of sheets and was thus felt as a slight loosening of the structure. Such a change in the front edge rigidity on the long run increases the risk for high-frequency fatigue damages.

The catalyst C of the present invention was inspected after the test cycle had been run for 40 hours. Then it could be observed that the catalyst honeycombs were still undamaged, and after the front cone was removed, it was noticed that the thermal expansion movement had been directed to the desired area in the sector which was not attached to the jacket, because when feeling the front surface of the honeycomb, it was substantially tighter as compared with structure D. With a non-centrally rolled honeycomb, in which the sheet ends were attached to a limited sector, it was possible to direct the thermal movement so that there was no inner loosening, and to improve both the durability for thermal fatigue and to increase rigidity in relation to high-frequency fatigue.

What is claimed is:

1. A catalyst support in which internal combustion engine exhaust gases are exposed to a catalyst, said catalyst support comprising:

a tubular peripheral jacket having a central axis, a cross-section of the jacket lying on a plane normal to the central axis being symmetrical with respect to the central axis; and a cylindrical honeycomb structure surrounded by said jacket, said honeycomb structure being formed by a plurality of abutting metal sheets arranged in a stack, the contiguous surfaces of which define planes of abutment that lie parallel to the central axis of the jacket, each of said metal sheets possessing two ends that are spaced from each other in a direction transverse to the central axis, at least one metal sheet in said stack being corrugated to form a plurality of gas flow channels in said honeycomb structure, said metal sheets being bent such that the planes of abutment are curved yet remain parallel to the central axis, free ends of the sheets so bent overlapping and being successively exposed at spaced locations along a first sector (S1) of the circumference of the honeycomb structure when seen in a cross-section normal to central axis, said honeycomb structure having a second circumferential sector (F1, F4) in which a surface of one of said sheets is exposed and the free ends of the sheets are not present, a joinder between said honeycomb structure and said jacket occurring at a peripheral fastening area (L1–L4) of said honeycomb structure which includes said first circumferential sector (S1) so that the joinder is confined a contiguous circumferential portion which is a fraction of the circumference of the honeycomb structure and so that the joinder is asymmetric with respect to the central axis, the remaining portion of the circumference of said honeycomb structure including said second circumferential sector (F1, F4) being devoid of joinder to the jacket.

2. A catalyst support according to claim 1, characterized in that the first sector ($S_1$) of the honeycomb structure circumference comprises 25–90% of the honeycomb's periphery.

3. A catalyst support according to claim 1, characterized in that the plurality of metal sheets comprises several pairs of metal sheets, each of said pairs comprising a substantially smooth or slightly corrugated metal sheet and a substantially corrugated sheet.

4. A catalyst support according to claim 3 characterized in that the substantially smooth or slightly corrugated sheet and the substantially corrugated sheet of a single pair of sheets are attached to each other by welding.

5. A catalyst support according to claim 3, characterized in that the plurality of metal sheets comprises 2–15 pairs of sheets.

6. A catalyst support according to claim 1 wherein the joinder is a brazing joint or a weld joint between the honeycomb structure and the jacket.

7. A catalyst support according to claim 1 characterized in that the jacket has a circular, semi-oval or oval cross-section.

8. A catalyst support according to claim 1, characterized in that the center of the honeycomb structure does not lie on the central axis of the jacket.

9. A catalyst support according to claim 4, characterized in that the plurality of metal sheets comprises 2–15 pairs of sheets.

10. A catalyst support according to claim 1, wherein the metal sheets are bent in an S shape and the exposed free ends of the metal sheets comprise both of the ends of the metal sheets.

11. A catalyst support according to claim 1, wherein the honeycomb structure is formed by a spirally-rolled stack of metal sheets in which the exposed free ends of the metal sheets originate from only one end of the stack of metal sheets and the stack of metal sheets possesses an increasing thickness in the direction in which the sheets are rolled.

12. A catalyst support according to claim 1, characterized in that the peripheral fastening area is axially arranged between the honeycomb structure and the jacket over at least a part of the axial length of the honeycomb structure.

13. A catalyst support according to claim 1, characterized in that the honeycomb structure further includes at least one reinforcing sheet, the reinforcing sheet having a thickness greater than that of other metal sheets contained in the plurality of metal sheets.

14. A catalyst support according to claim 13, characterized in that the reinforcing sheet possesses a length larger than lengths of metal sheets in the plurality of metal sheets so that the reinforcing sheet may form an intermediate layer between the honeycomb periphery and the jacket when the honeycomb structure and the jacket are assembled.

\* \* \* \* \*